US009235655B2

(12) United States Patent
Jackson

(10) Patent No.: US 9,235,655 B2
(45) Date of Patent: Jan. 12, 2016

(54) TASK-BASED DESIGN EVALUATION

(75) Inventor: Warren Bruce Jackson, San Francisco, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 887 days.

(21) Appl. No.: 10/851,485

(22) Filed: May 21, 2004

(65) Prior Publication Data

US 2005/0261881 A1    Nov. 24, 2005

(51) Int. Cl.
*G06G 7/48*       (2006.01)
*G06F 17/50*      (2006.01)
*G06K 9/46*       (2006.01)

(52) U.S. Cl.
CPC ............ *G06F 17/50* (2013.01); *G06F 2217/04* (2013.01); *G06K 9/4671* (2013.01)
USPC .................................................. 703/6

(58) Field of Classification Search
CPC .................................................. G06K 9/4671
USPC ............................................ 703/2, 6; 706/19
See application file for complete search history.

(56) References Cited

U.S. PATENT DOCUMENTS

| | | | |
|---|---|---|---|
| 5,579,446 A * | 11/1996 | Naik et al. ....................... 358/1.9 |
| 5,845,304 A | 12/1998 | Iijima ............................ 715/530 |
| 5,983,246 A | 11/1999 | Takano .......................... 715/514 |
| 6,167,410 A | 12/2000 | Imamura ........................ 715/530 |
| 6,199,034 B1 | 3/2001 | Wical ................................ 704/9 |
| 6,226,658 B1 | 5/2001 | Smith |
| 6,668,354 B1 * | 12/2003 | Chen et al. ..................... 715/517 |
| 6,687,404 B1 * | 2/2004 | Hull et al. ...................... 382/226 |
| 6,961,719 B1 * | 11/2005 | Rai ................................. 706/21 |
| 7,035,438 B2 * | 4/2006 | Harrington et al. ........... 382/112 |
| 7,035,467 B2 * | 4/2006 | Nicponski ..................... 382/224 |
| 7,096,153 B2 * | 8/2006 | Guralnik et al. ............... 702/179 |
| 7,120,868 B2 * | 10/2006 | Salesin et al. ................. 715/249 |
| 7,171,617 B2 * | 1/2007 | Harrington et al. ........... 715/255 |
| 7,243,303 B2 * | 7/2007 | Purvis et al. ................... 715/253 |
| 7,246,311 B2 * | 7/2007 | Bargeron et al. ............. 715/251 |
| 7,308,116 B2 * | 12/2007 | Harrington et al. ........... 382/112 |
| 7,523,086 B1 * | 4/2009 | Teague et al. ...................... 707/1 |
| 2001/0035875 A1 | 11/2001 | Suzuki et al. |
| 2002/0122067 A1 | 9/2002 | Geigel et al. |
| 2004/0032599 A1 | 2/2004 | Atkins et al. |
| 2004/0122760 A1 | 6/2004 | Clearwater et al. |
| 2004/0122805 A1 | 6/2004 | Sang et al. |
| 2004/0122806 A1 | 6/2004 | Sang et al. |
| 2004/0122858 A1 | 6/2004 | Clearwater |
| 2005/0071781 A1 | 3/2005 | Atkins |
| 2005/0071783 A1 | 3/2005 | Atkins |

(Continued)

OTHER PUBLICATIONS

Chen et al.; Web-enabled Customer-oriented Product Concept Formation via Laddering Technique and Kohonen Association; Concurrent Engineering: Research and Applications; pp. 299-310; Dec. 2002.*

(Continued)

*Primary Examiner* — Hugh Jones
(74) *Attorney, Agent, or Firm* — HP Inc. • Patent Department

(57) ABSTRACT

A proposed feature vector for a first deign is received and an existing feature vector for an existing design is retrieved for a given task. The proposed design is evaluated against the existing design using task-based scores associated with each design and based on their performances for the given task.

31 Claims, 7 Drawing Sheets

(56) References Cited

U.S. PATENT DOCUMENTS

| | | |
|---|---|---|
| 2005/0240865 A1 | 10/2005 | Atkins et al. |
| 2005/0273470 A1 | 12/2005 | Heigold |
| 2006/0026508 A1 | 2/2006 | Balinsky et al. |
| 2006/0103891 A1 | 5/2006 | Atkins |
| 2006/0150092 A1 | 7/2006 | Atkins |

OTHER PUBLICATIONS

Moskowitz: The intertwining of psychophysics and sensory analysis: historical perspectives and future opportunities—a personal view; Food Quality and Preference 14 (2002) 87-98.*

Papila: Neural Network and Polynomial-Based Response Surface Techniques for Supersonic Turbine Design Optimization; PhD thesis; 2001, University of Florida; 2001; pp. 1-107.*

Purvis et al., Creating Personalized Documents: An Optimization Approach, DocEng'03, Nov. 20-22, 2003, Grenoble, France. pp. 68-77.*

Jacobs et al., Adaptive grid-based document layout, ACM Transactions on Graphics (TOG) archive, vol. 22, Issue 3 (Jul. 2003), Proceedings of ACM SIGGRAPH 2003, pp. 838-847.*

* cited by examiner

TASK-BASED DESIGN EVALUATION

BACKGROUND

Documents often conform to a template, such as a design. The layout of any particular design is often subjectively resolved by a designer. Moreover, many designs lack objective and quantitative measures which would reliably permit one design to be evaluated against a different design. Consequently, design evaluations as to whether one design is better than another design are manually intensive exercises which include excessive individual subjectivity.

Furthermore, because designs lack objective and quantitative measures, there is a lack of understanding as to how much effort would be expended in moving from an existing design to a proposed design. Thus, reusing existing designs to create derivative designs is also problematic. Additionally, in order to optimize a design, small changes within that design should be quantitatively evaluated for determining which design parameters should be changed and by how much. Therefore, a quantitative and non subjective system for evaluating designs would be beneficial.

DETAILED DESCRIPTION

Figure 1:
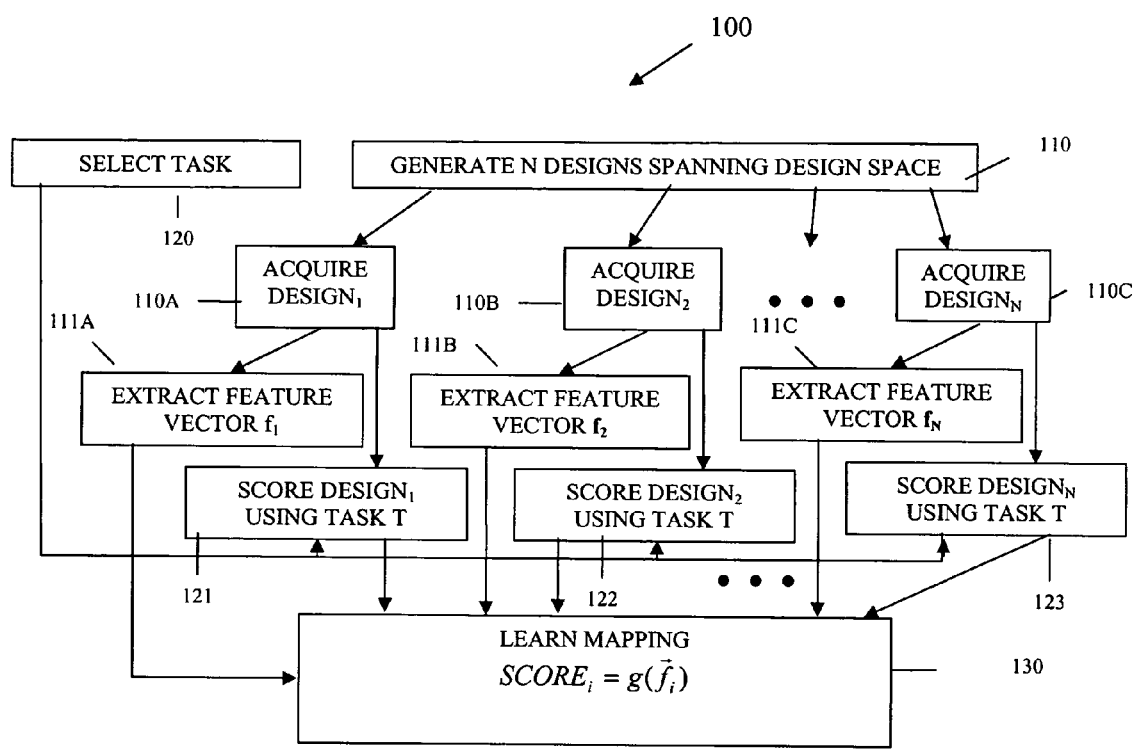
FIG. 1 is a diagram for evaluating designs, according to an example embodiment.

FIG. 1 is a diagram for one method 100 to evaluate designs. The method 100 is implemented in a machine-readable or accessible medium. In one embodiment, the method 100 represents a software system or service that evaluates designs. In one embodiment, the method 100 (herein after "service") can be networked across any network. In an alternative embodiment, the service is executed on a standalone processing device, and is not available over a network. In still another embodiment, the service is accessed over the Internet as a World-Wide Web (WWW) service available to a plurality of clients via their WWW browser applications.

As used herein a design is an electronic template for a document. The design can conform to particular syntaxes and/or semantics. Designs or templates can be formally represented in a plurality of manners, such as via an industry standard schema (e.g., eXtensible Markup Language (XML), Data Definition (DD), etc.) and via proprietary or custom-developed formats (e.g., application specific formats, such as formats used for templates processed in spreadsheets, word processors, database applications, etc.).

A document is any logical association of information, applications, and/or electronic media (e.g., graphics, video, text, image, audio, images, links, etc.) which is logically associated with one another. Thus, and by way of example only, a document can be a catalogue; a website having one or more web pages with links, information, media, and/or embedded services; a book; a magazine; a story; a multimedia presentation; reference manual; an ad campaign; and others.

A feature is an electronic description of elements and element attributes associated with a design. The formal description of the design (e.g., schema, template, etc.) identifies elements and attributes of elements. However, specific values that the elements and attributes can appear within instances of documents that implement or conform to the design. In some embodiments, multiple elements and/or attributes can be grouped together to form a single feature. Features can be structural, syntactical, and in some instances semantically defined. Features can also be associated with data types and have specific data attributes. A feature is an objective and quantitative representation of elements and element attributes that are included within a design.

By way of example only, some features can be defined as data types such as text, audio, a graphic, an image, a link, an executable reference to a service, a video. These data types can include attributes that define a structural placement of any particular data type within any document instance, which conforms to a design associated with the data types. Any particular structural attribute associated with a data type can be defined in terms of that particular data type's relative placement vis-à-vis another different data type or set of data types. Attributes can also define how any values for that data type are displayed, such as effects (e.g., bold, underline, italic, flashing, etc.), font sizes, all caps, font types, color, color distribution, texture, symmetry, white space, alignment, justification, repetition, etc.

Additionally, attributes can define semantic (content) values or range of values that any particular data type can have, such as an integer value, a value selected from a defined range of values, a verb, a proper name, a noun, a location, etc. Features can be continuous (e.g., slide along a continuous scale or range) or features can be discrete (e.g., binary or one or a set of defined values).

A single design can include nested sub designs. For example, a design for a website document can include a sub and independent design for an ad campaign. In a similar manner, a feature can be a data type that is actually a composite data structure (e.g., electronic object, custom-defined structure, etc.) having a plurality of sub data types. For example, a customer electronic object can include sub electronic objects for full name, address, account number, phone number, etc. There is no pre-set limit as to the recursive and nesting natures of designs and/or features.

A feature vector is an ordered or sequential concatenation of individual features that comprise a design. In some cases, this means that the features identified in a design are simply sequentially detected via parsing or any other technique and concatenated together to form a feature vector string. In other cases, construction of a feature vector is a more intelligent parsing technique that groups individual features into specific locations of the feature vector string or that combines some select features into a single Meta feature and uses the Meta feature in the feature vector string. Each unique design is represented by a unique feature vector. In some cases, the design is the feature vector. In other cases, the design is parsed or evaluated to acquire the features and to assemble the corresponding feature vector.

A task is used for establishing a score for a given design based on that design's feature vector. A task produces a mapping from a feature vector to a scoring space (dimension). The scoring space can be a single dimension (e.g., range of available numerical values for feature vectors) or the scoring space can be multi-dimensional (e.g., hierarchical or including multiple values having context).

A task can be a lower-level measurement or relationship, such as psychophysical reactions to a design, referred to as Just-Noticeable Difference (JND) measurements (e.g., visual sensitivity to small design changes, etc.). A task can also be a higher level measurement, such as experiments designed to determine objectively, through interactive experimentation or based on prior experimentation or knowledge, certain results or goals associated with a document that embodies a design. For example, how many individuals bought a product after seeing a document having a particular design? Some measurements associated with task performance include: factual recall about certain aspects of a design, name recognition associated with a product or service associated with a design, a most liked or preferred design, JND with small changes to one or more features of a design, and the like. Thus, in some embodiments, a task may be a low level perceptual task or a low level vision discernment task.

Tasks can be pre-defined and available for selection from a knowledge store for selection (off-line tasks). Some measurements associated with these predefined tasks may be automatically determined or resolved based on features included within a feature vector. That is, prior experimentation and knowledge may be electronically represented in a database for a given tasks performance, such that when a design and its feature vector is acquired, the measurements and results are known. Other tasks can be dynamically performed and evaluated interactively (on-line tasks), such as interactively presenting a subject with two designs and interactively altering various features in a series of evaluations, where during each evaluation the subject is forced to select a particular favored design; the results of these interactive evaluations are recorded as performance measurements for future consumption or immediate consumption (selection of a more desirable design).

Each design's feature vector is scored based on a particular selected task in order to account for its overall design, its independent features (feature vector), and in order to acquire an objective quantitative value, which can be compared to other scores for other feature vectors, which are associated with proposed designs. Comparisons between designs are based on the same tasks. That is, a first design's score for task X is compared to a second proposed design's score for the same task X. The score accounts for relationships among individual features, groupings of select features, and the entire set of features which comprise a feature vector.

Any particular score can be established along any pre-defined one-dimensional scale or range (e.g., 0-1, 1-100, a-z, etc.). A score can also be more complex, hierarchical, or multi-dimensional, such that certain components of the score reflect different quantitative evaluations. For example a score may be a floating point number from 0-10, where the integer portion represents a particular goal of an enterprise (e.g., revenue, expense, customer loyalty, etc.) and the decimal portion represents value along another scale from 0.1-0.9. A one-dimensional standard or a multi-dimensional standard for scores can be used with various embodiments presented herein.

A design's performance for any given task can be computed or mapped to a particular score based on a variety of custom developed or existing techniques. For example, a neural network or Bayesian network application can be trained against historical or training data for feature vectors and their known scores. Once configured, these applications can accept new undetected values for proposed feature vectors and map their performance to a particular score.

Alternatively, the relationships between each of the individual known features can be associated with a weight based on any existing or custom-developed weighting algorithm, such that the weighted sum of individual features within a feature vector are summed to acquire a score. The value for any particular weight can be acquired through historical analysis or through an existing knowledge store of an enterprise. Furthermore, in some less complex designs a score may actually be acquired by adding values (positive or negative) associated with each individual feature. In fact, any mapping or computation which assigns a score to a feature vector for a given task can be used with the various embodiments presented herein.

With the above-presented context, an example embodiment in FIG. 1 is now explained in detail. Initially, at 110, N designs are selected, acquired, or generated, where N is >=2 and is an integer value. The design space is space of all available designs described by substantially unique or distinguishable feature vectors. Once designs (110A, 110B, and 110C) are obtained, feature vectors that represent the features of those designs are extracted at 111A, 111B, and 111C.

At 120, a user or an automated script, application, or service selects a task which is used to compare the performance of the designs. The task can be high level, low level or a middle level of granularity. In one embodiment, at least one of the designs has previously been evaluated against the selected task, such that that design has a pre-existing score. In another embodiment, none of the designs has previously been evaluated against the selected task. In this embodiment, the designs are spanned within the design space, such that the new permutations represented by the designs being evaluated are mapped within the spanned design space.

At 121, 122, and 123 the task is used to score each of the designs, which provides each design with an objective and quantified score. Scores can be computed or mapped using neural networks, weighting algorithms, Bayesian networks, and other techniques. At this point, the individual scores can be compared directly against one another or compared in a more complicated manner, such as subtracting scores from one another and using the result to compare against a pre-defined threshold.

In one embodiment, at 130, the mappings and scores are fed to a leaning algorithm, where the mappings between designs and their performance on tasks are associated with a score within a range of available scores. The learning algorithm can be least squares, Bayesian networks, support vector machines, tree based categorization techniques, and others. This permits the processing of the method 100 to interpolate and provide estimates for new designs not previously encountered, which have not performed a particular task on which they are being scored. This can be achieved based on interpolating from the performance of previous designs against a given task and based upon the learned relationship between features in a new design's feature vector vis-à-vis the feature vectors of those previous designs.

As one example application of the processing of the method 100, consider print media or display media in which a particular design D1 represents an existing model design that produces a page or print media or browser media for a customer's consumption. The purpose of the design is to sell a product via an advertisement. The advertisement can be implemented on print media and sent via regular mail to the consumer or can be rendered within a World-Wide Web (WWW) browser for a consumer to view. Suppose further that experiments were conducted that measure JND of three design features, namely text font type, font color, and font size.

The JND is established by forced choice (e.g., present or absent) experiments with viewers. In these experiments, small changes in font type, color, and size are made in some outputs (advertisements) from design D1 compared to the original output of a D1 advertisement. Viewers are forced to indicate whether a change was detected or not. Based on the experiments, it is determined that in order to establish a greater than 50% detection of a change that a font size has to be at least changed by a delta S, a font color changed by a delta C, and font type by a delta T. The three deltas S, C, and T can be assigned weighting values (e.g., WS=1/S, WC=1/C, and WT=1/T) vis-à-vis one another based on the experimentation. A score can then be computed for any particular variation of D1, such as D1', by score D1'=(WS)(S')+(WC)(C')+(WT)(T'), where S', C', and T' are values font size, font color, and font type, respectively for design D1'.

In continuing with the present example, any derivation of D1 can now be objectively quantified and compared against the original model D1 or against other different derivations of D1 when a task is associated with altering font characteristics in terms of type, size, and/or color. New experiments and the task itself do not have to be directly performed against the new derivations of D1; rather, the score for the derivations can be interpolated based on the determined weights for the features of font type, font size, and font color.

The above-provided example was presented for purposes of illustration only, and is not intended to limit the disclosure. Thus, other experiments or knowledge can be embodied for tasks in an electronic medium and other scoring techniques can be used for purposes of determining relationships between features and scores associated with feature vectors. Additionally, in some embodiments, knowledge of tasks can be dynamically integrated into the processing of the method 100 in order to dynamically improve performance and the mapping of the scores.

The processing of the method 100 objectively represents designs, and scores those designs based on selected or given tasks. Those scores provide an objective and quantified technique for selecting one design over another design.

Additionally, it should be noted that the teachings of the method 100 can be used for off-line or on-line tasks. That is, the tasks can be acquired from a knowledge store or can be interactively acquired through interactions with one or more users in a dynamic environment. An example, on-line task might be the design and placement of a sidebar or popup for a World-Wide Web (WWW) browser page design. The number of hits that the various page designs receive can be used to score each of the various designs. A superior design might be a page design having the greatest number of hits. Automatic software can continually vary the page design parameters dynamically and interactively on-line until an optimal or acceptable score is obtained based on the number of hits. Of course a variety of other on-line tasks can be implemented with embodiments presented herein. Accordingly, the example presented is not intended to limit any aspect of the disclosure.

Figure 2:
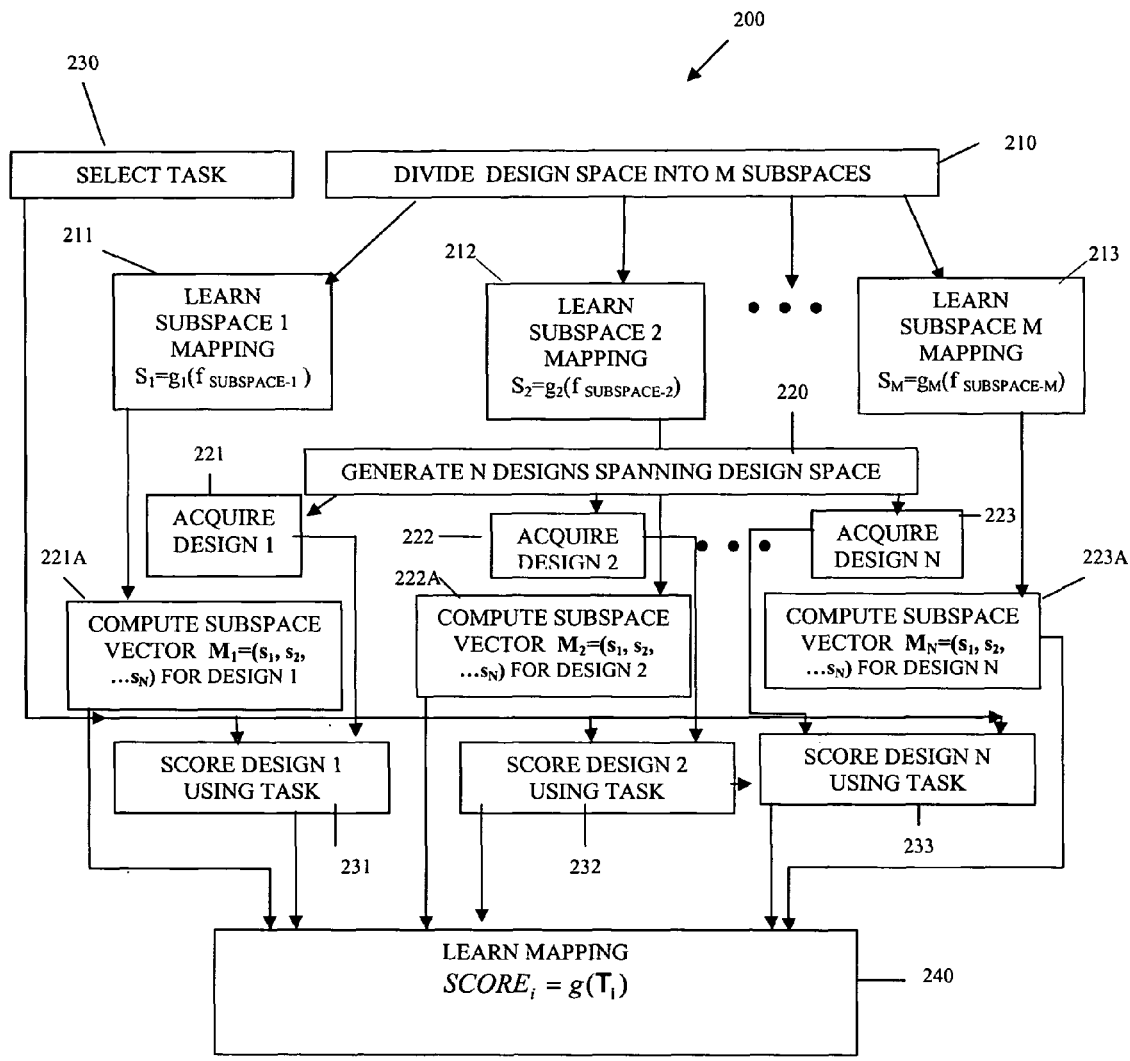
FIG. 2 is a diagram for evaluating designs, according to another example embodiment.

FIG. 2 is a diagram of another method 200 evaluating designs. The method 200 is implemented in a machine-accessible or readable medium. In some embodiments, the method 200 is optionally accessible over a network. The method 200 represents a service that augments method 100 of FIG. 1 by dividing and associating relationships between groups of features which a design space. That is, some groups of features may be logically associated or dependent upon one another for a given task. The method 200 depicts techniques for resolving these hierarchical relationships for given tasks, such that method 100 processes in a more efficient manner.

Accordingly, at 210, an existing design space is divided into M subspaces, where M is an integer number greater than 1. Subdivision can be achieved via a variety of approaches. For example, features in designs can be mined or clustered together based on identified and detected relationships between them. This results in learning the relationships of the features in each of the subspaces at 211, 212, and 213. As an example, consider that subspace 1 represents font sizes, colors, and types. These three features can be represented within the design space as a single Meta feature grouping or hierarchical feature set and treated as one unit for purposes of design evaluations. Any single design's feature vector can span multiple subspaces.

At 220, designs are generated, selected, or acquired for purposes of being compared against one another vis-à-vis performance against one or more selected tasks. This may result in two or more designs being acquired at 221, 222, and 223. At 221A, 222A, and 223A, the learned subspace association of groupings of various features from the design subspace M can be used to compute or reduce the feature vectors for each of the designs that are to be evaluated against one another. That is, rather than expressing a design in terms of its individual features within its feature vector, the feature vector is expressed with Meta features representing dependent or hierarchical groupings of specific features identified in the divided subspaces.

At 230, a task is selected to evaluate the performance of each design being evaluated against one another. Each design's feature vector is evaluated against the selected task to score each design at 231, 232, and 233. These scores provide the objective and quantified techniques for selecting one particular design as a desired or more acceptable design over the other available design choices. Again, at 240, the mapping between the performances of tasks to scores for feature vectors can be dynamically maintained and used for purposes of learning an evolving mapping. This learning can permit score interpolation when new designs are encountered without having to actually perform a given task against those new designs.

The processing of the method 200 demonstrates how features within a variety of designs can be logically associated into hierarchical Meta features. These Meta features can be used to reduce the processing complexities of method 100 of FIG. 1. Moreover, the processing of method 200 can run in a batch mode, where it is used to mine a legacy data store of designs and determine which designs should be removed and which should remain. Alternatively, the processing of the method 200 can run in a dynamic or interactive mode where information is dynamically and interactively acquired and evaluated.

Again it is noted that the teachings of the method 200 can be applied to on-line or off-line acquired tasks. That is, tasks can be acquired from an enterprise's knowledge store or can be interactively performed by automated applications or user in a dynamic fashion.

Figure 3:
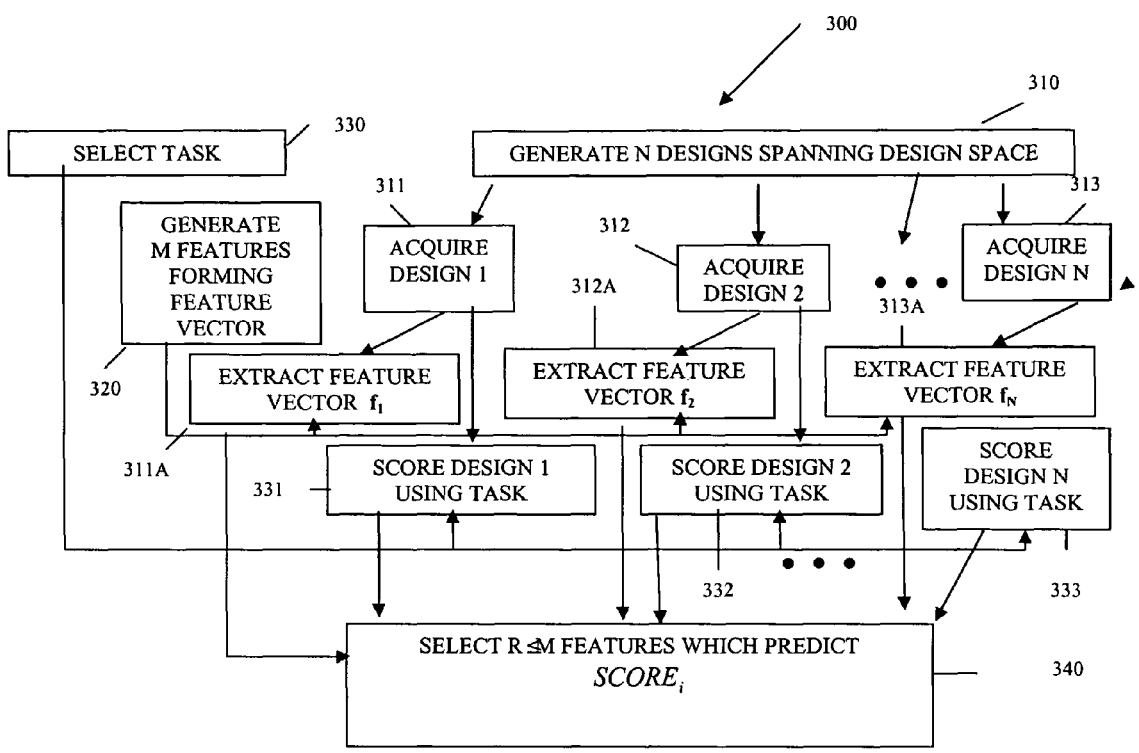
FIG. 3 is a diagram for determining feature vectors when evaluating designs, according to an example embodiment.

FIG. 3 is a diagram of still another method 300 for determining feature vectors for evaluating designs. The method 300 can be used for determining the implementation of 111A, 111B, and/or 111C of FIG. 1. Moreover, the method 300 is implemented in a machine-accessible or readable medium. The method 300 depicts processing that can be used to enhance or augment methods 100 and 200 of FIGS. 1 and 2, respectively, in that the processing of the method 300 permits automatic derivation of features which can be used to generate a design.

This is particularly useful when a proposed design change is desired to a model design, but performing the change results in a less acceptable design. The description presented below demonstrates how the proposed changes can be made along with other changes in order to automatically generate a more desirable design. This is achieved by predicting the desired feature(s) which may be added to a proposed design change in order to acquire a new design that is an improvement over an existing model design.

At 310, two or more designs are generated or selected from a spanning design space. In other words, various permutations of designs along a continuum are defined within the design space. These designs are acquired at 311, 312, and 313. At 311A, 312A, and 313A the feature vectors for these designs are extracted or derived. At 320, the feature vectors are derived from features available in the spanned design space M. Thus, any particular feature represented in the feature vectors is selected from the M features defining the spanned design space. These features can be logically associated and grouped as Meta features as described above with the method 200 of FIG. 2.

At 330, a task is selected from a data store or knowledge store of tasks which is used to evaluate the performance of each of the acquired designs. The evaluations result in each design receiving a score for the selected task at 331, 332, and 333. Using the scores and feature vectors obtained previously, 340 selects those features that predict the scores and substantially eliminates those features that do not affect the score. Some features will not contribute to the score of a particular design. For example, an invisible feature will not contribute to the performance of a task at all. Other features may only have a small affect on the score. In 340, the features are ranked according to their significance in changing the task-based score. The process can be accomplished by factor analysis, principal component analysis, or other techniques. Once R features that predict the scores ($Score_i$) are known, if much of a particular score is not predicted, then the method 300 can be repeated, such that if the scoring is at least partially predicted, then a set of feature vectors comprised of R features is used in 111A, 111B, and/or 111C of FIG. 1 to generate a desired design having a desired score.

In some embodiments, the processing of the method 300 can be provided a model design, certain proposed features, and a desired score or desired increase in score. Armed with these parameters the processing can mine the design space and generate a proposed new design having the proposed feature changes and having a higher score than the existing model design. Alternatively, the processing of method 300 could automatically mine existing model designs and select optimal feature improvements to improve or optimize scores for those model designs.

The method 300 can be processed with on-line or off-line acquired tasks. Some off-line tasks are selected in an automated manner from an enterprise's task knowledge store. Other on-line tasks are automatically assigned or selected by automatic applications or through dynamic interactions with subjects or users.

Figure 4:
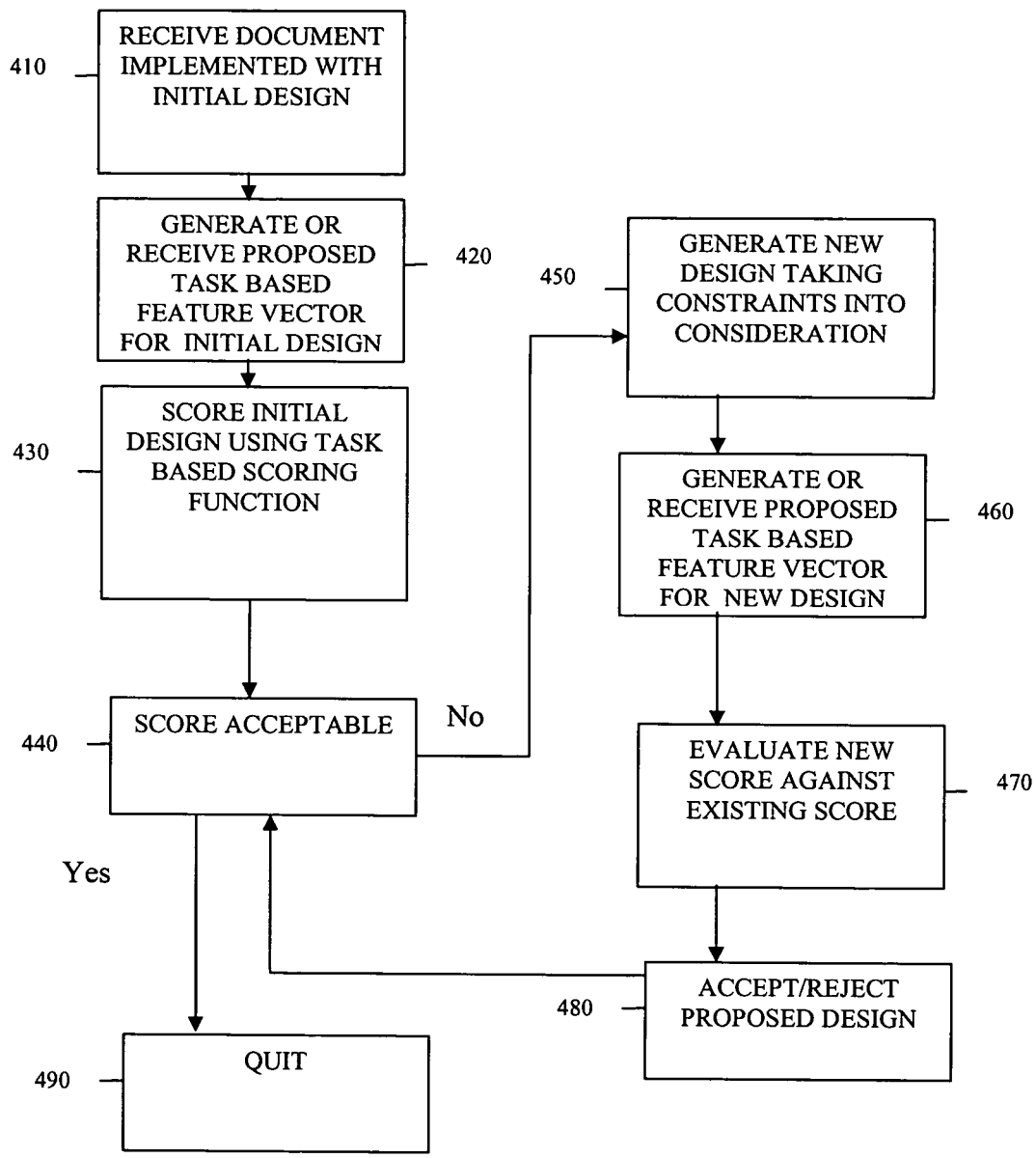
FIG. 4 is a diagram for determining optimal designs, according to an example embodiment.

FIG. 4 is a diagram of a method 400 for determining optimal designs. The method is implemented in a machine-accessible or readable medium and is optionally accessible over a network. The method 400 incorporates various processing aspects of method 100, 200, and 300, of FIGS. 1-3, respectively. The method 400 (hereinafter "service") is used for purposes of objectively evaluating two or more designs vis-à-vis one another.

Initially, a particular proposed design may not specifically exist. That is, a document may embody or implement the proposed design, but that design and/or its proposed feature vector that represents the design may not have been formally represented. Accordingly, at 410, such a document is received. At 420, that document is parsed and its design (e.g., schema, DD, template definition, etc.) is generated or acquired, and its task-based feature vector is generated. Alternatively, at 420, the service may simply receive an already generated or proposed task-based feature vector for a proposed design.

Next, the service retrieves an existing design's feature vector for the task being proposed. The existing design and its existing feature vector will be objectively compared against the proposed design and the proposed task-based feature vector for purposes of determining whether the proposed design is an improvement or whether another design can be generated that includes changes of the proposed design and additional changes in order to obtain an improvement over the existing design.

At 430, the proposed task-based feature vector is scored using a task-based scoring function (e.g., obtained by fitting the score, feature vector pairings using weighting, neural networks, Bayesian networks, least squares, vector support matching techniques, etc.). At 440, that task-based score is compared to the desired score. If the score is not acceptable, then, at 450, and in some embodiments, a new feasible design is generated respecting any user-specified constraints.

At 460, the new design's task-based scoring of the feature vector is generated or received and, at 470, this new task-based feature vector's new score is evaluated against the score of the existing model design. If that new score is acceptable, then the proposed design is accepted at 480, if it is not acceptable it is rejected.

The service can continue processing until an optimal design is reached at which point processing for a particular design ends at 490. The service may also be configured at 440 to quit and accept a proposed design change if a proposed score exceeds or is more favorable than an existing score for an existing model design.

Figure 5:
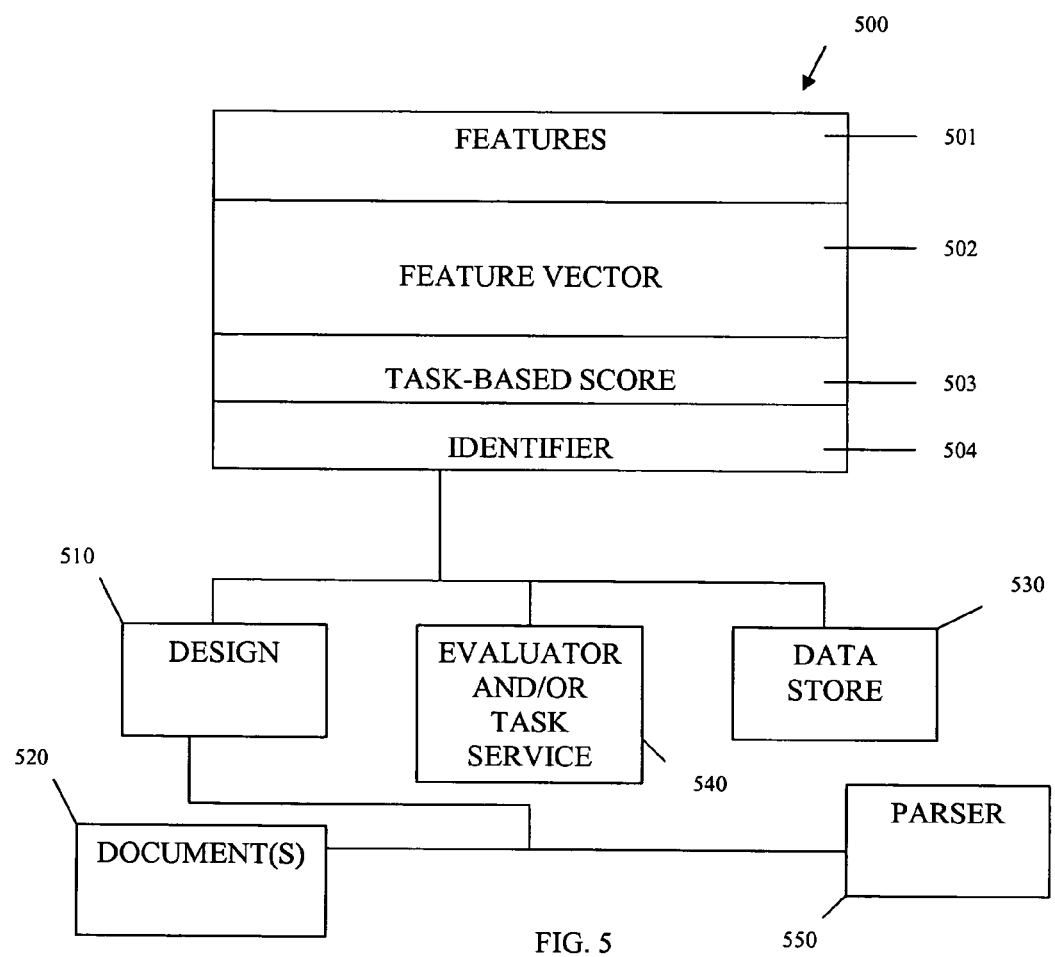
FIG. 5 is a diagram of design data structure which assists in evaluating designs, according to an example embodiment.

FIG. 5 is a diagram of design data structure 500 which assists in evaluating designs. The design data structure 500 is implemented in a machine readable and accessible medium. The elements of the design data structure 500 can be stored contiguously within the medium or in non-contiguous locations with the medium or one or more different media and logically associated therewith. Moreover, the medium or media can be volatile, non-volatile, permanent, or removable. In one embodiment, two or more instances of the design data structure 200 are consumed by a service that objectively evaluates an existing design and a proposed design, such as the service described above with methods 100-400 of FIGS. 1-4, respectively.

The design data structure 500 includes features 501, a feature vector 502, a score tasked-based 503, and, optionally a unique identifier 504. The features 501 define aspects of a particular design 510. Each feature 501 identifies an element and/or element attribute included within that design 510. A number of those elements and element attributes can identify the structural placement and specification of any particular element within a document 520 that conforms to the design 510. Moreover, a number of those elements and element attributes can define semantics associated with values that particular elements can have within a document 520 that conforms to the design.

The feature vector 502 is string which represents a concatenation of the individual features 501. That concatenation can be sequential; meaning that the order of the features 501 is maintained in the feature vector 502. Alternatively, the concatenation can be logical, such that certain select features 501 are grouped together within the feature vector 502. In one embodiment, the feature vector 502 may include selective groupings of a number of the features 501 and represent those groupings with a different single feature 501. In still other embodiments, the feature vector 502 may include more than one feature 501 for a single identified feature 501. In other words, an identified feature 501 may be expanded into a series of two or more features 501 within the feature vector 502.

The tasked-based score 503 is dynamically resolved for the data structure 200 for a particular task. Once resolve it may be physically carried with the design data structure 500 as Meta data or it may be logically associated with the design data structure 500. Logical association can be acquired by way of a hard reference, pointer, or link retained physically within the design data structure 500. Alternatively, logical association can be acquired via a unique identifier 504 associated with the design data structure 500 that can be consumed to index into a data store 530 for acquiring the tasked-based score 503; consumed to contact an evaluator service 540 for acquiring the tasked-based score 503; or consumed to acquire a design 510 that carries the tasked-based score 503 as Meta data.

The tasked-based score 503 can be dynamically resolved by acquiring a pre-determined tasked-based score 503 or by requesting via a consuming evaluator service 540 that the tasked-based score 503 be resolved. Any particular value for a score tasked-based 503 is based on a mapping of the feature vector 502 to a performance space having a range of values for a particular task. Techniques for achieving this mapping are described above with respect to methods 100-400 of FIGS. 1-4, respectively.

In some embodiments, the design data structure 500 also includes a physical or logical reference to a task determining or selecting application 540, such that an evaluator service 540 which consumes the design data structure 500 can communicate with that task determining or selecting application 540 for resolving a task-based score 503 for a feature vector 502 for a given selected task. In other embodiments, the evaluator service 540 retains knowledge about the identity of a task determining application 540 on its own and does not have a reference to the same from the design data structure 500.

In one embodiment, the identifier 504 permits different populated instances of the design data structure 500 to be uniquely indexed and housed in a data store 530. Thus, an evaluator service 540 can use the identifier 504 for acquiring multiple instances of the design data structure 500 associated with derivatives of the same design 510 or a model design 510 in order to compare the tasked-based scores 503 of the multiple instances and select a desired design instance 510 or generate a new design instance 510.

In yet another embodiment, the design data structure 500 is dynamically instantiated or populated with values to create a specific design data structure instances 500 in response to processing a parsing application 550. The parsing application 550 parses a document 520 that implements a design 510 in order to generate that design 510 and a populated instance of the design data structure 500.

Two or more instances of the design data structure 500 can be consumed by an evaluator service 540 for purposes of objectively comparing different designs 510. Where one or more of those derivative designs 510 are derived from an existing model design 510. The evaluator service 540 may select one of the designs 510 being compared or may elect to generate and entirely new instance of the design 510 in order to achieve a desired design 510 which is deemed optimal based on the tasked-based score 503 of the new design 510.

Figure 6:
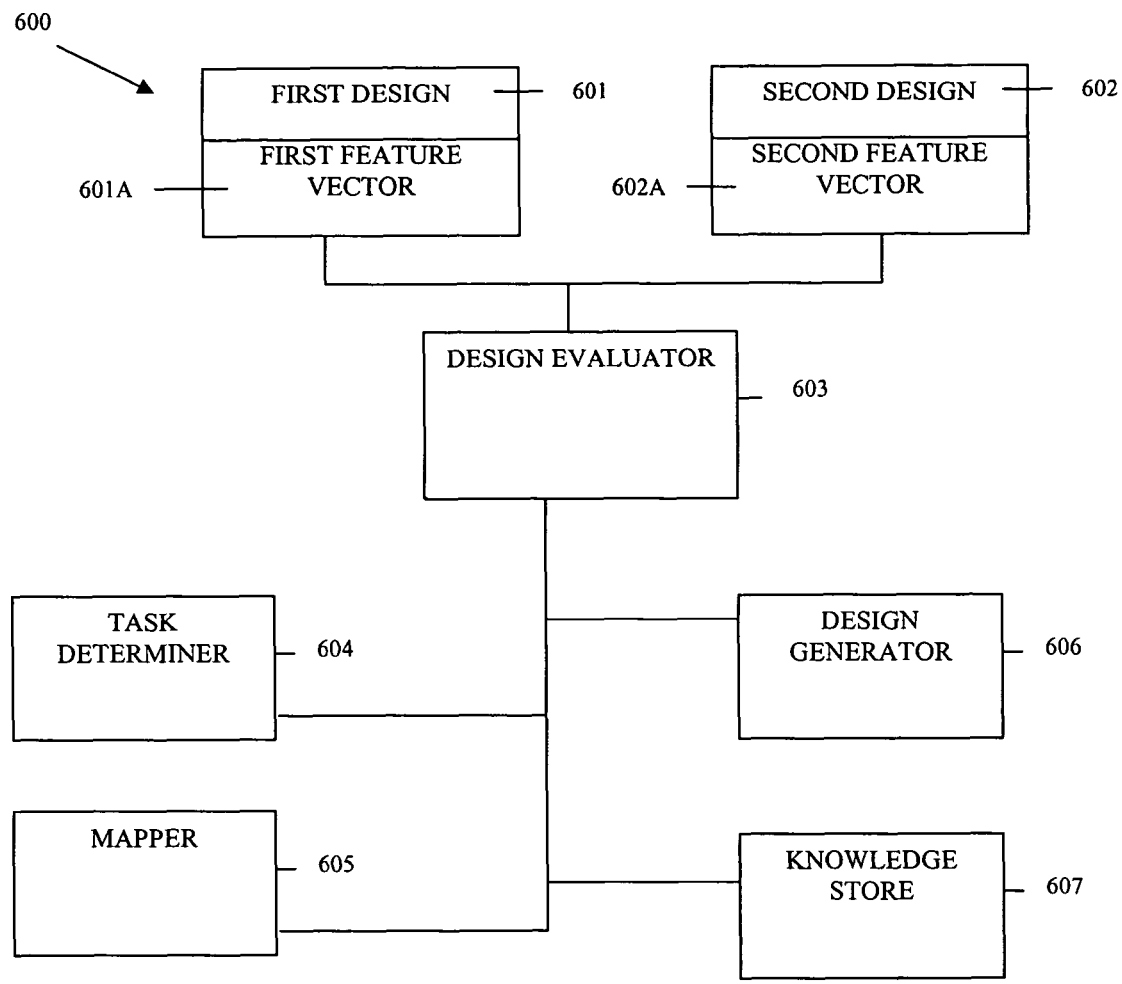
FIG. 6 is a diagram of a design evaluation system, according to an example embodiment.

FIG. 6 is a diagram of a design evaluation system 600. The design evaluation system 600 is implemented in a machine readable and accessible medium. In one embodiment, the design evaluation system 600 implements the service or methods 100-400 of FIGS. 1-4, respectively and consumes the design data structure 500 of FIG. 5 for purposes of objectively evaluating two designs and selecting one of those designs or generating an entirely new design. The design evaluation system 600 objective compares and evaluates two or more designs vis-à-vis one another.

The design evaluation system 600 includes a first design 601, a second design 602, a first task-based feature vector 601A, a second task-based feature vector 602A, and a design evaluator 603. In some embodiments, the design evaluation system 600 also optionally includes a task determiner or selector 604, a mapper 605, a design generator 606, and a knowledge store 607.

The designs 601 and 602 are formal representations or definitions of how documents, which are derived from the designs 601 and 602, are to appear and in some cases what content or types of content those documents can have. A design 601 or 602 can be electronic representation in formal language syntaxes (e.g., XML, schemas, DDs, etc.) or can be represented in custom or proprietary syntaxes (e.g., word processing templates, database tables, spreadsheet templates, etc.).

From the designs 601 and 602 features can be identified or derived. These features represent permissible syntactical, structural, and semantic elements and their concomitant attributes, which are included within or derived from the designs' 601 and 602 formal notations. Each set of features for a particular design 601 or 602 can be consumed to produce a first task-based feature vector 601A and a second task-based feature vector 602A. In one embodiment, the feature vectors 601A and 602A are the designs 601 and 602, respectively. In other embodiments, the feature vectors 601A and 602A are assembled by parsing and evaluating the designs 601 and 602, respectively.

The design evaluator 603 performs operations similar to what was discussed above with methods 100-400 of FIGS. 1-4, respectively. Thus, the design evaluator 603 receives a first feature vector 601A and a second feature vector 602A and evaluates a task-based first score associated with the first task-based feature vector 601A against a second task-based score associated with a second task-based feature vector 602A. The evaluation can be achieved in isolation with the design evaluator 603 or can be achieved with the cooperation of a variety of other additional services 604-607. The result of the evaluation is that one of the two designs 601 or 602 is selected as an optimal design or that a new third design is generated in order to achieve an optimal design.

In one embodiment, during operation of the design evaluation system 600, the design evaluator 603 acquires the feature vectors 601A and 602A for the first and second designs 601 and 602, respectively, which are being evaluated or compared for a specific selected task. Next, the design evaluator 603 identifies the first feature vector 601A as being associated with an existing model first design 601. Accordingly, the second feature vector 602A for the second design 602 includes proposed changes to one or more features of the first design 601 which are enumerated in the first feature vector 301A. The two feature vectors 601A and 602A are passed to a task determiner 604.

The task determiner 604 inspects the two feature vectors 601A and 602A, and interfaces with the mapper 605 for purposes of acquiring or assigning a first score and a second score to the first feature vector 601A and the second feature vector 602A. These actions can be used to weight or initially score the individual features of the second feature vector 602A, which is then passed to the mapper 605. In one embodiment, the task determiner 604 acquires weights for identified feature changes of the second feature vector 602A from a knowledge store 607.

The mapper 605 maps the entire second feature vector 602A and any weighted or scored features to a performance score. Mapping techniques can include weighting algorithms, summing algorithms, neural networks, Bayesian networks, and the like. The mapper 605 accounts for the entire relationship between all the features as a whole which comprise the second feature vector 602A. The mapping is based on a specific selected task for which the performance of the two designs 601 and 602 are being compared against.

In a like manner the first feature vector 601A can acquire a task-based score that is already associated with the first feature vector 601 for the given task or is dynamically resolved by the design evaluator 603 contacting the mapper 605 or contacting a knowledge store 607 which indexes a previously computed or mapped score which is determined by the mapper 605 for the first feature vector 601A based on the specifically selected task.

The design evaluator 603 then compares the first task-based score for the first feature vector 601A against the second estimated task-based score for the second feature vector 602A. At this point based on the configuration options or command instructions provided to the design evaluator 603, the design evaluator 603 may decide that the second design 602 is more desirable than the first design 601 based on the comparisons of the scores or the design evaluator 603 may decide that in order to achieve the desired changes of second design 602 a new third design with one or more additional changes should be constructed or derived. This means that the design evaluator 603 can optimally derive a design which will include the changes identified by the second design 602, but in so doing the design evaluator 603 determines other feature changes have to occur in order to product that new design which is deemed superior to both the first and second designs 601 and 602.

In one embodiment, the design evaluator 603 uses a design generator 606 in order to produce an optimal new design, which includes changes of the second design 602 and one or more additional changes. A technique for achieving this new feature selection based on constraint features was presented above with method 400 of FIG. 4. That is, the design evaluator 603 does not have to include the logic to generate or derive a new design, but can interface with a module, such as design generator 606, in order to achieve this functionality. This has the benefit of creating a more modular architecture for the design evaluation system 600.

FIG. 6 is presented for purposes of illustration only. The arrangement and components can be altered, more components can be added, or some components can by subsumed into other components, without departing from the teachings of the design evaluator system 600. All such architectural arrangements are intended to be included with embodiments and teachings presented herein.

Figure 7:
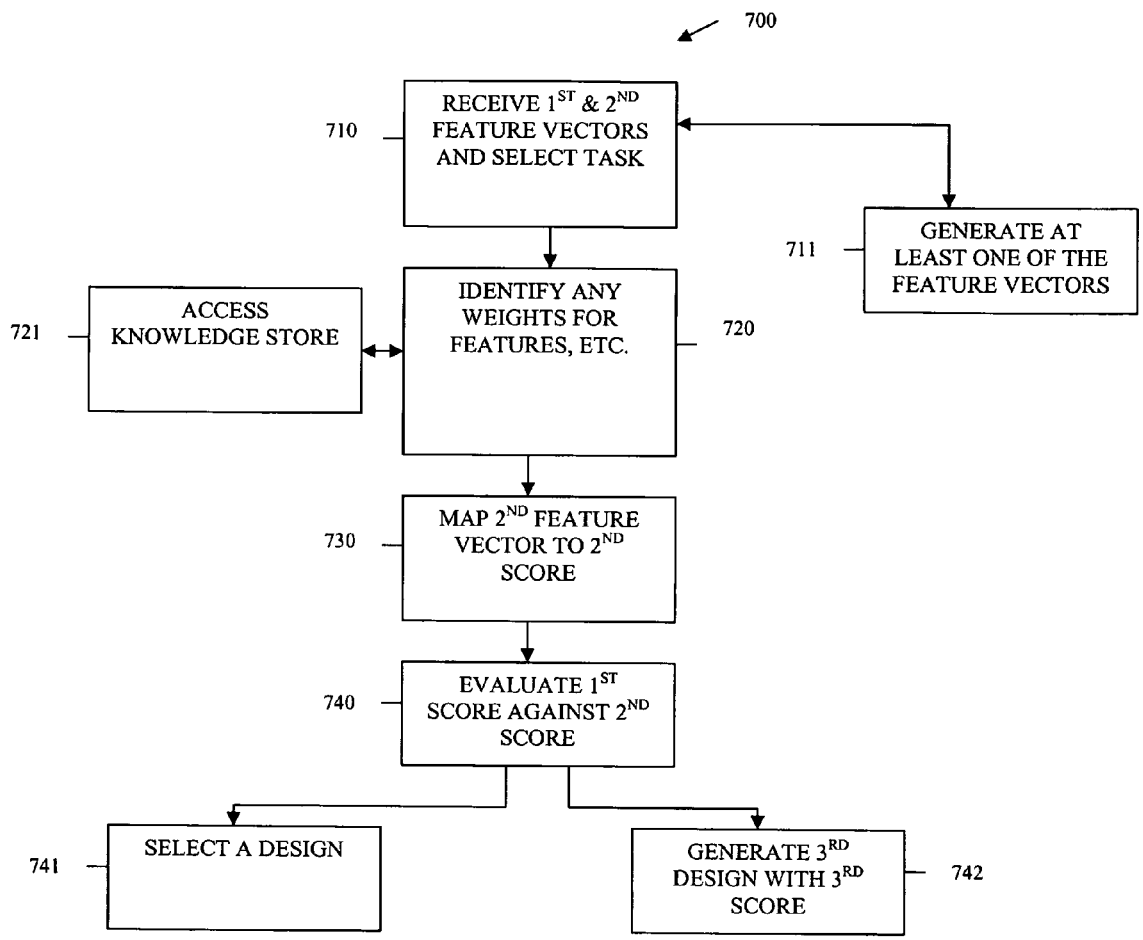
FIG. 7 is a diagram associated with the processing of instructions that evaluates designs, according to an example embodiment.

FIG. 7 is a diagram associated with the processing of instructions that evaluates designs. The instructions reside and are implemented on one or more machine accessible and readable media. When accessed or processed on a machine or processing device, the instructions perform the method 700 of FIG. 7. The instruction can be downloaded or uploaded to the machine for processing from one or more removable or permanent machine accessible and readable media. In some embodiments, the instructions and the method 700 which they perform are available over a network. In another embodiment, the instructions and the method 700 which they perform are available on a stand alone machine not accessible over a network.

Initially, at 710, the instructions receive first and second feature vectors and a specific task is selected. The first feature vector defines features in a first design, and the second feature vector defines features in a second design. In one embodiment, at 711, the instructions generate at least one of the feature vectors from a corresponding design or from a document that conforms or implements a particular design.

At 720, the instructions identify weights or factors associated with various features in the feature vectors. That is, some features may be grouped together as Meta features and some features or Meta features may include weighted values. In one embodiment, this information can be acquired by accessing a knowledge store at 721.

At 730, the second feature vector is mapped to a second task-based score. The mapping of the second feature vector to a second task-based score can be achieved via any mapping algorithm, such as a neural network, a Bayesian network, a weighting algorithm, a summing algorithm, and the like. Essentially, the mapping rates the estimated performance of the second feature vector for the selected task based on a known performance space for feature vectors for the given task. That performance space includes a range of potentially available scores for feature vectors for a given task. The mapping accounts for all the intra relationships between the features that comprise the feature vector.

The mapping can also be used to acquire a first task-based score for the first feature vector. Alternatively, the first task-based score can be carried with the first feature vector or acquired from an external location (e.g., data store, data structure, file, etc.) using the identity of the first feature vector and/or the identity of the first design associated with the first feature vector and the identity of the given task.

At 740, the instructions evaluate the first task-based score vis-à-vis the second task-based score. Evaluation can be simple or complex. For example, a simple numeric comparison can be used to determine which score is higher. Alternatively, the difference between the two task-based scores can be compared to other metrics, such as a threshold value.

In one embodiment, at 741, the instructions select one of the designs as an optimal or desired design based on the evaluation. This may mean that the proposed second design is now accepted as a first and model design or that the proposed second design is rejected, thereby accepting the first design as an optimal or desired design.

In another embodiment, at 742, the instructions can be configured to derive or generate a new third design based on the evaluation. That third design will include the proposed changes of the second design plus one or more additional changes deemed appropriate by the instructions in order to generate a third feature vector having a third score, where that third score is more favorable than the first score or the second score.

Embodiments presented herein demonstrate how designs can be objectively represented and evaluated against one another for given tasks. This permits reuse of designs, decreases design development, and provides objective mechanisms for enterprises to properly select designs when selection is desired.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A non-transitory computer readable medium for evaluating electronic templates for documents, said computer readable medium having instructions thereon, the instructions when accessed performing the method comprising:
   selecting a task to evaluate variations of a model electronic template;
   receiving a plurality of feature vectors, one feature vector representing the model electronic template, and the remaining feature vectors representing the variations to the model electronic template;
   assigning scores to the feature vectors as a function of applying the task to the model electronic template and the variations of the model electronic template;
   learning a mapping between the scores and the feature vectors;
   evaluating the scores of the model electronic template and the variations to the model electronic template;
   evaluating correlation strengths between variations in features for the model electronic template and the variations to the model electronic template against variations in the scores for the model electronic template and the variations to the model electronic template to identify one or more features that contribute to the scores for the model electronic template and the variations to the model electronic template;
   performing a scoring operation on the model electronic template and the variations to the model electronic template based upon the task and the one or more features identified to contribute to the scores;
   selecting either the model electronic template or one of the variations to the model electronic template based upon the scores; and
   displaying the document having the selected one of the model electronic template and the one of the variations of the model electronic template.

2. The non-transitory computer readable medium of claim 1, wherein learning further includes processing a support vector machine.

3. The non-transitory computer readable medium of claim 1, wherein receiving further includes processing a feature vector extractor and a design receiver.

4. The non-transitory computer readable medium of claim 1, wherein receiving further includes spanning a number of the feature vectors within a feature vector space.

5. The non-transitory computer readable medium of claim 1, wherein assigning further includes representing the task as a low level perceptual task.

6. The non-transitory computer readable medium of claim 1, wherein assigning further includes representing the task as a just noticeable difference task.

7. The non-transitory computer readable medium of claim 1, wherein assigning further includes determining the score based on weights obtained from the task which is a just noticeable difference task.

8. The non-transitory computer readable medium of claim 1, wherein selecting the task further includes acquiring the task as an off-line task.

9. The non-transitory computer readable medium of claim 1, wherein the document is any logical association of at least one of information, applications, and electronic media, displayable on an electronic display, and wherein the displayed document is configured to conform to at least one of particular syntaxes and semantics.

10. A non-transitory computer readable medium for evaluating electronic templates for documents, said computer readable medium having instructions thereon, the instructions when accessed performing the method comprising:
    acquiring a task to evaluate an electronic template;
    acquiring the electronic template and one or more additional electronic templates for respective documents;
    generating features for the electronic template and the one or more additional electronic templates;
    scoring the electronic template and the one or more additional electronic templates using the task;
    evaluating correlation strengths between variations in the features against variations in scores for the electronic template and the one or more additional electronic templates to identify one or more features that contribute to the scores for the electronic template and the one or more additional electronic templates;
    performing a second scoring operation on the electronic template and the one or more additional electronic templates based upon the task and the one or more features identified to contribute to the scores;
    selecting either the electronic template or one of the one or more additional electronic templates based upon the scores; and
    displaying the document having the selected one of the electronic template and the one or more additional electronic templates.

11. The non-transitory computer readable medium of claim 10, wherein evaluating further includes using a principal component analysis.

12. The non-transitory computer readable medium of claim 10, wherein acquiring the task further includes interactively acquiring the task as an on-line task.

13. The non-transitory computer readable medium of claim 10, wherein acquiring the task further includes acquiring the task from a knowledge store as an off-line task.

14. The non-transitory computer readable medium of claim 10, wherein acquiring the task further includes acquiring the task as a low-level vision discernment task.

15. The non-transitory computer readable medium of claim 10, wherein the document is any logical association of at least one of information, applications, and electronic media, displayable on an electronic display, and wherein the displayed document is configured to conform to at least one of particular syntaxes and semantics.

16. A non-transitory computer readable medium having a data structure for evaluating electronic templates for documents stored thereon, the data structure comprising:
- code defining a plurality of features defining aspects of an electronic template for a document displayable on an electronic display stored on the computer readable medium;
- code defining a feature vector string representing a concatenation of a plurality of vectors stored on the computer readable medium;
- code defining a task-based score stored on the computer readable medium for the feature vector string which is dynamically resolved by processing a mapping function for a selected task for use in evaluating and selecting the electronic template;
- code defining correlation strengths between variations in the features for the electronic template against variations in the task-based score to identify one or more features that contribute to the task-based score;
- code defining a further score based on the performance of a scoring operation on the electronic template based upon the selected task and the one or more features identified to contribute to the task-based score; and
- code defining a reference to a task determining application that permits a task to be determined or selected.

17. The non-transitory computer readable medium of claim 16, wherein each of the features identifies a particular element or element attribute included within the electronic template.

18. The non-transitory computer readable medium of claim 16, wherein each feature identifies a structural placement for a particular element within a document that conforms to the electronic template.

19. The non-transitory computer readable medium of claim 16, wherein a number of the features define semantics associated with values that particular elements can have within a document that conforms to the electronic template.

20. The non-transitory computer readable medium of claim 16, wherein the document is any logical association of at least one of information, applications, and electronic media, displayable on an electronic display, and wherein the displayed document is configured to conform to at least one of particular syntaxes and semantics.

21. The non-transitory computer readable medium of claim 16, further comprising code defining a unique identifier for the data structure which is used for housing instances of the data structure in a data store.

22. The non-transitory computer readable medium of claim 16, wherein the data structure is dynamically instantiated by a parsing application that parses a document which implements the electronic template.

23. The non-transitory computer readable medium of claim 16, wherein the selected task is acquired as an off-line task from a knowledge store or as an on-line task from interactive and dynamic processing.

24. A non-transitory computer readable medium having a data structure for evaluating electronic templates for documents stored thereon, said data structure comprising:
- code defining first and second electronic templates for respective documents displayable on an electronic display stored on a computer readable medium;
- code defining first and second feature vectors, wherein the first feature vector represents the first electronic template and the second feature vector represents the second electronic template;
- code defining a design evaluator that evaluates a first task-based score associated with the first feature vector against a second task-based score associated with the second feature vector for a given selected task for future electronic template selection;
- code defining correlation strengths between variations in features for the first electronic template or variations in features for the second electronic template against respective variations in the first task-based score to identify one or more features that contribute to the first task-based score or variations in the second task-based score to identify one or more features that contribute to the second task-based score;
- code defining a further score based on the performance of a scoring operation on the first electronic template or the second electronic template based upon the selected task and the one or more features identified to contribute to the first task-based score or the second task-based score; and
- code defining a task determiner that assists in selecting the task.

25. The non-transitory computer readable medium of claim 24, further comprising code defining a mapper that interfaces with the design evaluator for mapping the first feature vector to the first task-based score and mapping the second feature vector to the second task-based score.

26. The non-transitory computer readable medium of claim 25, further comprising code defining a design generator that parses one or more documents to generate at least one of the electronic templates.

27. The non-transitory computer readable medium of claim 26, wherein the design generator interfaces with the design evaluator to generate a third electronic template which includes differences between the first and second feature vectors and at least one additional change, and wherein the third electronic template is represented by a third feature vector and a third task-based score and the third task-based score is greater than the first or second task-based scores for the task.

28. The non-transitory computer readable medium of claim 27, wherein the third electronic template is used as a template for producing one or more instances of a document.

29. The non-transitory computer readable medium of claim 24, further comprising a knowledge store that houses the task and a plurality of other tasks, and wherein the design evaluator is interfaced to the knowledge store.

30. The non-transitory computer readable medium of claim 24, wherein the given selected task is acquired as an off-line task.

31. The non-transitory computer readable medium of claim 24, wherein the document is any logical association of at least one of information, applications, and electronic media, displayable on the electronic display, and wherein the displayed document is configured to conform to at least one of particular syntaxes and semantics.

* * * * *